3,194,179
MONORAIL SYSTEM
Lester G. Scherer, 13111 Ventura Blvd.,
Studio City, Calif.
Filed Aug. 9, 1963, Ser. No. 301,071
11 Claims. (Cl. 104—121)

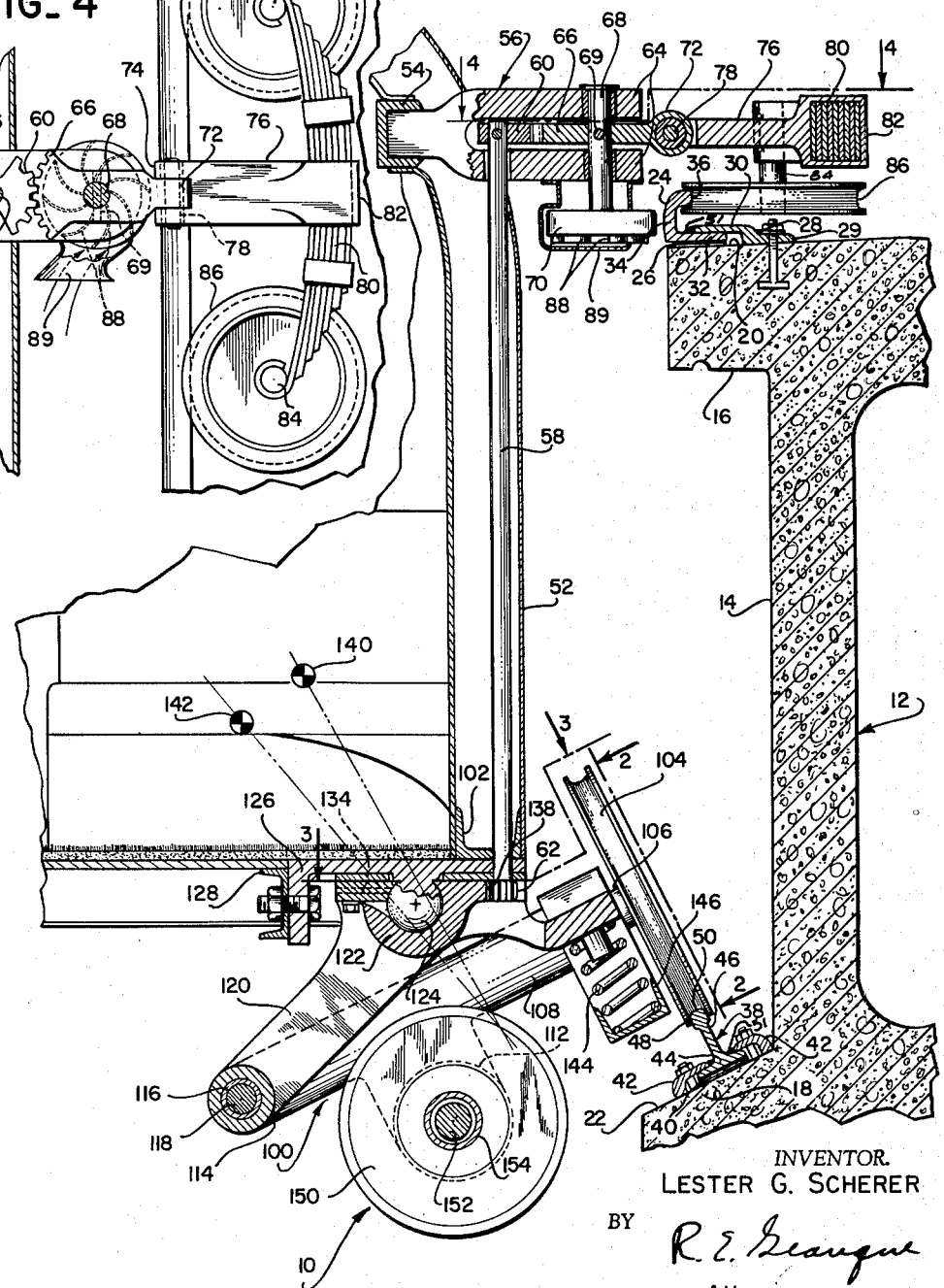
July 13, 1965     L. G. SCHERER     3,194,179
MONORAIL SYSTEM
Filed Aug. 9, 1963     3 Sheets-Sheet 1
INVENTOR.
LESTER G. SCHERER
Attorney July 13, 1965  L. G. SCHERER  3,194,179
MONORAIL SYSTEM
Filed Aug. 9, 1963  3 Sheets-Sheet 2
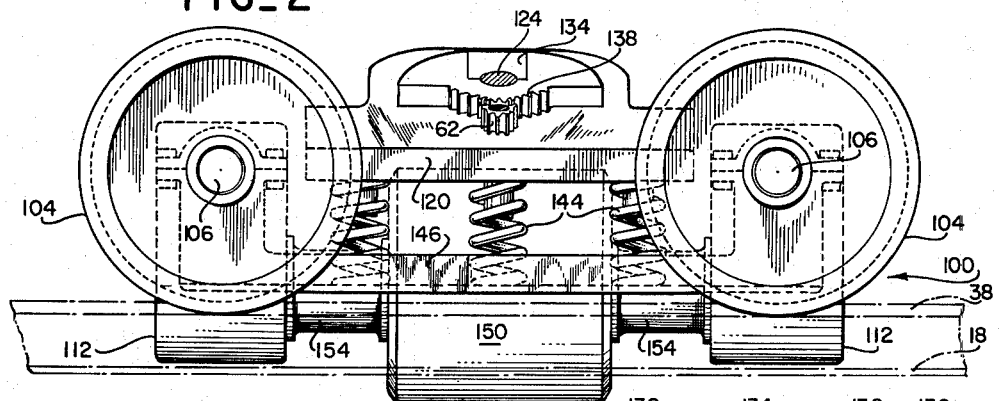
FIG_2
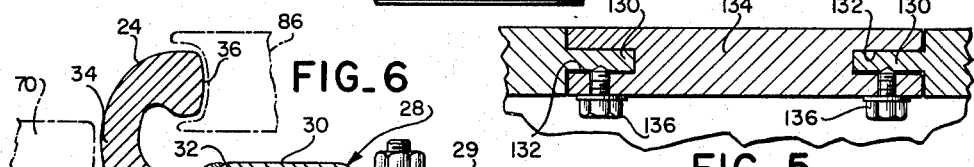
FIG_6  FIG_5
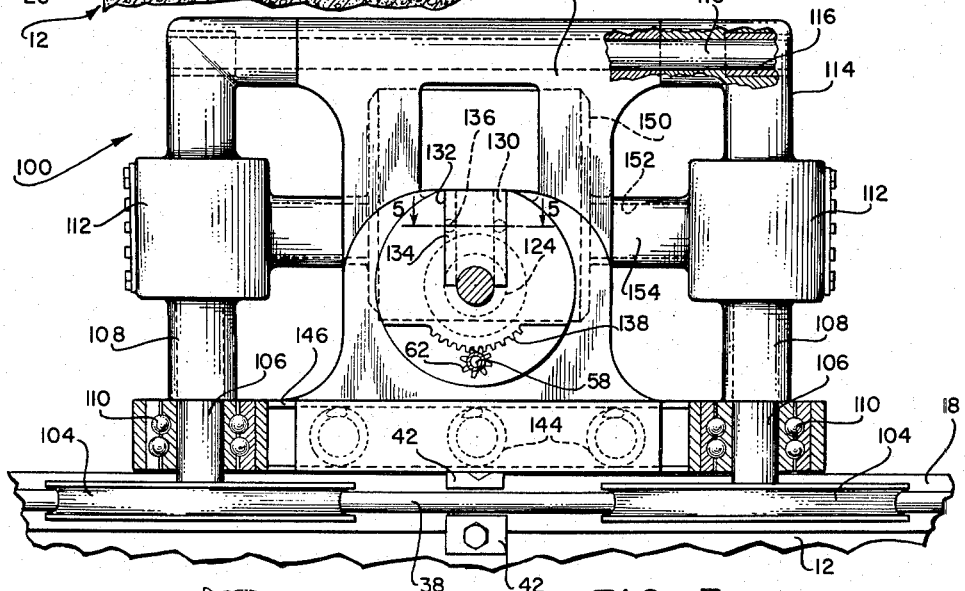
FIG_3
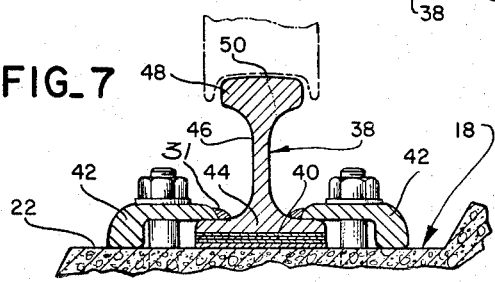
FIG_7
INVENTOR.
LESTER G. SCHERER
BY R. E. Izangue
Attorney July 13, 1965  L. G. SCHERER  3,194,179
MONORAIL SYSTEM
Filed Aug. 9, 1963  3 Sheets-Sheet 3
FIG_9
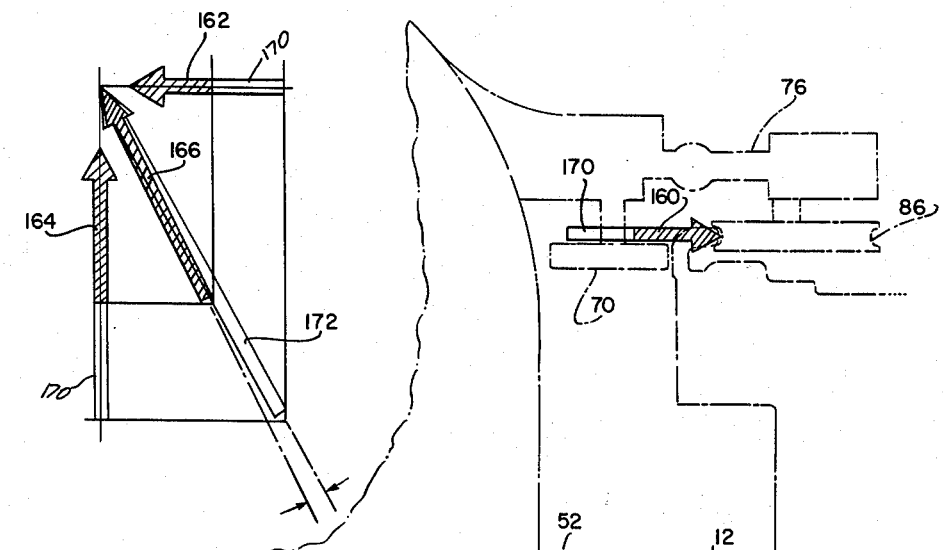
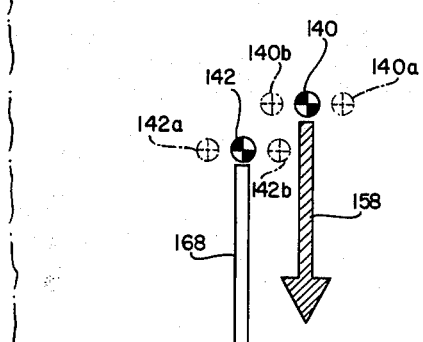
FIG_8
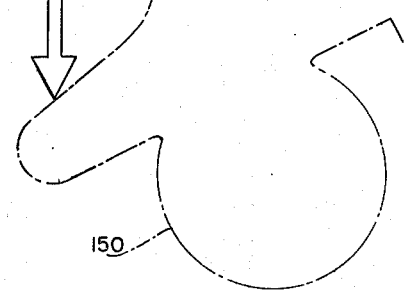
INVENTOR.
LESTER G. SCHERER
BY R. E. Geauque
Attorney

# United States Patent Office 3,194,179
Patented July 13, 1965

This invention relates to a monorail system, and more particularly to a modification of the monorail system disclosed and claimed in copending application Serial No. 202,639, filed May 28, 1962, now U.S. Patent No. 3,122,105.

One embodiment of the monorail system disclosed in said copending application comprises a car body having lower wheel means wherein each individual wheel is rotatable about an axis substantially normal to the resultant of the forces directed by the car on the track upon which the wheels ride. The resultant of the forces directed by the car is predicated on a predetermined center of gravity for the car and its load. While generally satisfactory, this arrangement has the disadvantage that the axis remains fixed even though the center of gravity shifts slightly depending upon the car load or when the car travels around curves.

A disadvantage of some railway systems, whether dual rail or monorail, resides in the fact that the wheels are mounted on trucks which will not pivot on curves so that the wheel flanges abrade the rails on curves.

In view of the foregoing, it is a primary object of the present invention to provide a monorail system having wheels rotatable about axes which are self-adjustable to remain substantially normal to the resultant of the forces directed by the car on its track even though the center of gravity of the car shifts.

Another object of the present invention is to provide sensing means to sense curves in a track and pivot the wheel-carrying trucks so that the wheels will follow a curve in the track without sidewise abrasion against the track.

Yet another object of the present invention is to provide means for linking an upper set of track engaging wheels to a lower set of track engaging wheels in such a manner that the lower set is pivoted by the upper set causing the lower set to follow a continuous change in direction of the upper set as it negotiates curves on a monorail.

A further object of the present invention is to provide a new and useful monorail system.

According to the present invention, a monorail system is provided wherein a chassis unit is supported on wheels adapted to ride upon the lower portion of a track supporting means and rotate upon axes which are substantially normal to the resultant of the forces directed by the chassis on the lower portion of the track supporting means regardless of the location of the center of gravity of the chassis. The upper portion of the track supporting means is provided with an upstanding rail having an inwardly facing portion which is engageable by wheels rotatably mounted on the upper portion of the chassis and rotating in a substantially horizontal plane. Curve sensing means is provided by having the upper wheel assemblies linked to the lower wheel assemblies in such a manner that, as the upper wheels negotiate sharp curves, a torque shaft imparts angular movement to the lower wheel assemblies causing them to follow the path taken by the upper wheel assemblies.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGURE 1 is a fragmentary, cross-sectional view with parts shown in elevation, of the monorail system of the present invention;

FIGURE 2 is an elevational view, with parts shown in perspective, taken along line 2—2 of FIGURE 1;

FIGURE 3 is a cross-sectional view taken along line 3—3 of FIGURE 1;

FIGURE 4 is a cross-sectional view taken along line 4—4 of FIGURE 1;

FIGURE 5 is a partial, cross-sectional view taken along line 5—5 of FIGURE 3;

FIGURE 6 is a cross-sectional view, on an enlarged scale, of a portion of the device of FIGURE 1 showing the upper track member;

FIGURE 7 is a cross-sectional view, on an enlarged scale, showing the lower track member of FIGURE 1;

FIGURE 8 is a diagrammatic view showing force diagrams of the monorail system of the present invention in a loaded and unloaded condition; and FIGURE 9 is a force diagram of the forces on the load carrying wheels of the monorail chassis in a loaded and unloaded condition.

Referring again to the drawings, and particularly to FIGURES 1–7, the monorail system constituting the present invention, generally designated 10, includes a track beam 12 having a vertical web 14, an upper flange 16 and a lower flange 18. The upper flange 16 has an upper face 20 lying at substantially right angles to the web 14 and the lower flange 18 has an upper face 22 forming an angle of more than 90 degrees with the vertical web 14.

A rail 24 is mounted on a resilient pad 26 on the face 20 and is secured thereto by a plurality of plates 28 having an aperture leg 29 bolted to the track beam 12 and a second leg 30 extending into clamping engagement with a base portion 32 of the rail 24. The rail 24 includes a wall 34 extending upwardly from the flange 16 and a wheel-contacting face 36 which faces inwardly toward the major axis of the track beam 12. A lower rail 38 is mounted on a resilient pad 40 on the face 22 of flange 18 and is secured thereto by a plurality of plates 42 which are bolted to the flange 18 in clamping relation with the base 44 of the rail 38. The rail 38 includes a web 46 and an upper flange 48 which is slightly crowned at 50 to form a wheel-contacting surface, which will remain perpendicular to a wheel riding thereon even through the plane of the wheel shifts somewhat. Of course, it is apparent that the pad 40 may be wedge-shaped to slant the rail 38 on curves. The legs 30 and plates 42 are secured to the rails 24 and 38, respectively, by welds 31.

A car 52 is mounted on track beam 12 for travel along the rails 24 and 38. The car 52 includes an upper framing member 54 to which a bifurcated member 56 is rigidly affixed. A torque tube 58 is rotatably mounted on the bifurcated member 56 and carries a gear sector 60 at one end and has a pinion 62 rigidly affixed to its other end. The bifurcated member 56 includes arms 64 between which a gear sector 66 is mounted on a shaft 68. The gear sector 66 is pinned to shaft 68 by a pin 69 and engages the sector 60. The shaft 68 is rotatably mounted on arms 64 and has an anti-derailment wheel 70 rotatably mounted on its lower end. The gear sector 66 includes an arm 72 which extends into engagement with the bifurcated end 74 of a bogie or truck 76. A pin 78 pivotally connects the arm 72 to the truck 76 so that the truck 76 can pivot to compensate for changes in the elevation of car 52 when it is loaded, but will swing the gear sector 66 about the shaft 68 when the truck 76 is pivoted in a horizontal plane to follow track 24 around curves. The truck 76 includes a leaf spring 80 which carries an axle 84 at each end. A track engaging wheel 86 is rotatably mounted on each axle 84 and engages the face 36 of track 24 to laterally support the car 52. Although the weight of the car 52 will normally maintain the wheels 86 in engagement with the track 24, the anti-derailment wheel 70 is mounted adjacent the track 24 intermediate the wheels 86 and will engage the wall 34 to prevent derailment on curves and the like. A plurality of fins 88 are mounted on the underside of wheel 70 so that air directed thereto by an air scoop 89 while the car 52 is in motion will cause the wheel 70 to spin so that it will be in motion when brought into engagement with the wall 34. Of course, it is apparent that one truck 76 is positioned near the front of car 52 and that a second truck 76 is positioned near the rear of car 52.

A pair of trucks, such as the one shown at 100, are positioned near the front and rear portions, respectively, of the car 52 to carry the weight thereof on the rail 38. The trucks 100 are attached to the car 52 under a side rail 102 which extends along one edge of the car 52. Each truck 100 includes a pair of wheels 104 which ride upon the rail 38 and carry the weight of the car 52. Each wheel 104 is rigidly affixed to an axle 106 which is rotatably mounted in a housing 108 by bearing 110. Each axle 106 extends into driving engagement with a gear, not shown, in an enlargement 112, forming part of the housing 108. The housing 108 also includes an L-shaped member 114 which carries a resilient bushing 116 which, in turn, pivotally engages a fixed shaft 118 extending through a hanger plate 120. The hanger plate 120 includes a socket member 122 in which a ball member 124 is seated. The ball member 124 is carried by a plate 126 which is bolted to a channel member 128 and extends under the side rail 102 on car 52. The socket member 122 includes tongues 130 which are engaged by the grooves 132 formed in a retainer plate 134. The plate 134 engages the ball 124 to maintain it is seated relation in socket 122. A pair of cap screws 136 are employed to maintain the plate 134 in its closed position.

The socket of member 12 includes a gear sector 138 which engages the pinion 62 on torque tube 58 so that a torque transmitted through the torque tube 58 by rotation of sector 66 driving gear 66 will pivot the trucks 100 about the ball 124 so that the wheels 104 will follow the same path taken by the wheels 86 on curves. Thus, the upper wheels 86 and the associated means connecting them to the trucks 100 constitute sensing means to sense curves and pivot trucks 100 to prevent wheels 104 from abrading track 38 on curves. The ball member 124 is located in such a manner that the turning axis for the truck 100 lies along a line approximately midway between the center of gravity 140 for the car 52 when it is empty and the center of gravity 142 for the car 52 when it is loaded. Each truck 100 carries a plurality of coil springs 144 which have one end seated in a channel member 146 extending between each housing 108 of each truck 100 and which have another end seated against the plate 120. The load versus length relationship of each spring 144 is such that the axle 106 automatically adjusts itself to remain at right angles to the resultant of the forces exerted by the car body 52 on the rail 38 so that the wheel 104 will be adjusted to remain substantially parallel to the resultant regardless of the location of the center of gravity of the car body.

A suitable power source, such as a motor 150, is mounted between portions of housing 108 and has a shaft 152 extending from each end thereof through a tubular member 154 into a respective enlargement 112 to drive the axles 106 through gears, not shown.

Force diagrams for the car 52 in a loaded condition and an empty condition, respectively, are shown in FIGURES 8 and 9. When the car is empty, the load through the center of gravity 140 is represented by the vector 158, the horizontal force exerted by the rail 24 on the wheels 86 is represented by the vector 160, the horizontal force exerted by the rail 38 on the wheels 104 is represented by the vector 162 and a vertical force exerted by the rail 38 on the wheels 104 is represented by the vector 164. The resultant of the forces 162 and 164 is represented by the vector 166. When the car 52 is loaded or is traveling around a curve at high speed, the center of gravity shifts to the approximte point identified by the numeral 142 and the load through the center of gravity 142 is represented by the unshaded vector 168. Then the horizontal force exerted by the rail 24 on the wheel 86 becomes that represented by the vector 160 plus the unshaded portion 170. Likewise, an increment 170 is added to each of the vectors 162 and 164 and the resultant shifts, as shown by the vector 172. When an unloaded car travels around curves, the center of gravity 140 may shift to the positions marked 140a and 140b. Also, when a loaded car travels around curves, the center of gravity 142 may shift to the positions marked as 142a and 142b.

It is an important feature of the invention that regardless of the position of the center of gravity of the car 52, the axes of rotation of the wheels 104 will be automatically adjusted by springs 144 to remain substantially normal to the resultant of the forces of the car 52 directed towards the treak 38 to minimize any side forces tending to cause the wheels 104 to skid laterally relative to the track 38 or rubbing of wheel flanges against the sides of flange 48. The crown 50, under these conditions, provides a number of different wheel-contacting surfaces.

While the particular monorail system herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

What is claimed is:

1. In a monorail car system including:

track supporting means having an upper portion and a lower portion;

first rail means mounted on said upper portion of said track supporting means at one side thereof and extending upward therefrom to provide a surface facing inwardly toward a vertical plane passing through said track supporting means;

second rail means carried by the lower portion of said track supporting means and located on the exterior surface of said one side, the combination therewith:

a car adapted to travel along said one side of said track supporting means;

first wheel means mounted substantially perpendicular to said surface of said first rail means for engagement therewith and being located at the side of said car in order to hold said side of said car adjacent said upper portion of said track supporting means;

axes means pivotally connected to the lower portion of said car and extending transversely of said second rail means for up and down movement relative thereto;

second wheel means mounted on said axes means and engaging said second rail means; and spring means acting between said car and said axes means for positioning said second wheel means about the pivot of said axes means; the resultant of the forces exerted by said second wheel means on said second rail means being substantially normal to said axes means regardless of the position of the center of gravity of said car.

2. In a monorail car system including:

a track supporting means having an upper portion and a lower portion;

first rail means mounted on said upper portion of said track supporting means at one side thereof and extending upward therefrom to provide a surface facing inwardly toward the vertical plane of said track supporting means;

second rail means carried by the lower portion of said track supporting means and located on the exterior surface of said one side of said track supporting means, the combination therewith:

a car adapted to travel along said one side of said track supporting means;

first wheel means mounted substantially perpendicular to said surface of said first rail means for engagement therewith and having first truck means pivotally connected about an upright axis with the upper portion of said car in order to hold the upper portion of said car adjacent said upper portion of said track supporting means;

said first truck means pivoting relative to said car when engaging a portion of said first rail means which changes direction in order to turn said car;

second truck means comprising hanger means pivotally connected to the lower portion of said car for movement relative to said car about an upright axis;

axes means pivotally connected to said hanger means for up and down movement and extending from said car substantially transversely of said second rail means;

second wheel means mounted on said axes means substantially perpendicular to said axes means for engagement with said second rail means to support the major portion of the weight of said car;

resilient means extending between said axes means and said hanger means for maintaining said axes means in a plane substantially normal to the resultant of the forces passing through the center of gravity of said car regardless of the load carried by said car; and means connecting said first truck means to said second truck means in such a manner that pivoting of said first truck means pivots said second truck means, whereby said second wheel means will follow the path taken by said first wheel means.

3. In a monorail system including:

a track beam having upper and lower portions;

first rail means mounted on said upper portion at one side thereof and extending upward therefrom to provide a surface facing inwardly toward the vertical plane of said beam;

second rail means carried by said lower portion and located on the exterior surface of said one side, in combination therewith:

a car frame adapted to travel along said one side of said track beam;

first wheel means mounted substantially perpendicular to said surface of said first rail means for engagement therewith and being located at the side of said car frame in order to hold said side of said car frame adjacent said upper portion;

second wheel means engaging said second rail means;

axes means pivotally mounted at one end on the lower portion of said car frame for up and down movement and extending from said car frame for mounting said second wheel means on the other end; and means for maintaining said axes means substantially perpendicular to the resultant of the forces passing through the center of gravity of said car, said last mentioned means shifting the position of said axes means about its pivotal mounting as the said center of gravity shifts.

4. In the monorail system of claim 3 including hanger means connected with said car frame for pivotally mounting said axes means;

said hanger means being connected by socket means to said car frame for rotation of said hanger means and said axes means; and means connecting said hanger means to said first wheel means for rotating said hanger means in response to a change of position of said first wheel means as said car travels around curves, whereby said second wheel means will follow the path of travel of said first wheel means.

5. In the monorail system of claim 3 including drive means connected to said second wheel means for driving said car frame along said second rail means.

6. In the monorail system of claim 3 wherein said first wheel means has side flanges at the outer circumference for receiving a horizontally inwardly extending portion of said first rail means; third wheel means rotatably mounted adjacent said first wheel means for selective engagement with the side of said rail means opposite said inwardly facing surface for preventing said first wheel means from derailing by said portion moving out of the space between said flanges.

7. In a monorail system including:

a track beam having upper and lower portions;

first rail means mounted on said upper portion at one side thereof and extending upward therefrom to provide a surface facing inwardly toward the vertical plane of said beam;

second rail means carried by said lower portion and located on the exterior surface of said one side thereof, the combination therewith:

an elongated car adapted to travel along said one side of track beam;

first truck means pivotally connected about an upright axis and located at the side of said car, said first truck means including first wheel means mounted substantially perpendicular to said surface of said first rail means for engagement therewith to hold said side of said car frame adjacent said upper portion;

second truck means pivotally connected about an upright axis to the lower portion of said car, said second truck means including second wheel means and axes means extending transversely of said second rail means for mounting said second wheel means substantially perpendicular to the surface of said second rail means for engagement therewith to hold the lower portion of said car away from said lower flange and support the major portion of said car; and means connecting said first truck means to said second truck means for transmitting pivotal movements of said first truck means to said second truck means to pivot said second truck means.

8. In the monorail system of claim 7 including means connecting said axes means to said second truck means for maintaining said axes means in a plane substantially normal to the resultant of the forces passing through the center of gravity of said car regardless of the position of said center of gravity.

9. In a monorail system, the combination comprising:

a car frame adapted to travel along one side of a track beam;

wheel means connected to the lower portion of said car frame and located on the side adjacent said track beam, said wheel means comprising an axis extending from said adjacent side of said car frame and supporting a wheel at one end riding upon a track on said track beam;

means for pivotally connecting the other end of said axis to said car frame; and resilient means located between said car frame and said axis to maintain said axis substantially perpendicular to the resultant of the load forces exerted by said wheel means on said track regardless of the position of the center of gravity of said car frame.

10. The combination of claim 9 wherein said resilient means comprises coil spring means having a load versus length relationship such that said axis automatically adjusts itself as said center of gravity shifts so that said axis remains substantially perpendicular to the resultant of said load forces.

11. In a monorail car system including:
a track supporting means having an upper portion and a lower portion;
first rail means mounted on said upper portion of said track supporting means at one side thereof and extending upward therefrom to provide a surface facing inwardly toward the vertical plane of said track supporting means;
second rail means carried by the lower portion of said track supporting means and located on the exterior surface of said one side of said track supporting means, the combination therewith;
a car adapted to travel along said one side of said track supporting means;
first wheel means mounted substantially perpendicular to said surface of said first rail means for engagement therewith and having first truck means pivotally connected with the upper portion of said car in order to pivot relative to said car when said first rail means changes direction and to hold the upper portion of said car adjacent said upper portion of said track supporting means;
second truck means comprising hanger means pivotally connected to the lower portion of said car for movement relative to said car;
axes means pivotally connected to said hanger means for up and down movement and extending from said car substantially transversely of said second rail means, and second wheel means mounted on said axes means substantially perpendicular to said axes means for engagement with said second rail means to support the major portion of the weight of said car; and
resilient means extending between said axes means and said hanger means for maintaining said axes means in a plane substantially normal to the resultant of the forces passing through the center of gravity of said car regardless of the load carried by said car.

References Cited by the Examiner
UNITED STATES PATENTS

| | | | |
|---|---|---|---|
| 313,830 | 3/85 | Meigs | 104—120 |
| 1,388,508 | 8/21 | Brillhart | 105—168 X |
| 1,656,902 | 1/28 | Buchli | 105—168 |
| 3,050,195 | 8/62 | Eiler | 104—119 |
| 3,122,105 | 2/64 | Scherer | 105—147 |

MILTON BUCHLER, *Primary Examiner.*

LEO QUACKENBUSH, *Examiner.*